US011325104B2

(12) United States Patent
Hurst et al.

(10) Patent No.: US 11,325,104 B2
(45) Date of Patent: May 10, 2022

(54) SYSTEM AND METHOD OF APPLIED RADIAL TECHNOLOGY CHROMATOGRAPHY

(71) Applicant: emp Biotech GmbH, Berlin (DE)

(72) Inventors: Alistair J. Hurst, Bunkeflostrand (SE); Derek W. K. Levison, Berlin (DE)

(73) Assignee: EMP BIOTECH GMBH, Berlin (DE)

( * ) Notice: Subject to any disclaimer, the term of this patent is extended or adjusted under 35 U.S.C. 154(b) by 29 days.

(21) Appl. No.: 16/212,742

(22) Filed: Dec. 7, 2018

(65) Prior Publication Data

US 2019/0176127 A1    Jun. 13, 2019

Related U.S. Application Data

(60) Provisional application No. 62/595,826, filed on Dec. 7, 2017.

(51) Int. Cl.
| | | |
|---|---|---|
| *B01D 15/18* | (2006.01) | |
| *B01D 15/20* | (2006.01) | |
| *B01J 20/26* | (2006.01) | |
| *B01J 20/28* | (2006.01) | |
| *G01N 30/38* | (2006.01) | |
| *G01N 30/52* | (2006.01) | |

(52) U.S. Cl.
CPC ........ *B01J 20/28052* (2013.01); *B01D 15/18* (2013.01); *B01D 15/206* (2013.01); *B01J 20/26* (2013.01); *B01J 20/28004* (2013.01); *B01J 20/28016* (2013.01); *B01J 20/28083* (2013.01); *B01J 20/28085* (2013.01); *G01N 30/38* (2013.01); *G01N 30/52* (2013.01); *G01N 2030/386* (2013.01); *G01N 2030/525* (2013.01)

(58) Field of Classification Search
CPC ........... B01J 20/28052; B01J 20/26; B01J 20/28004; B01J 20/28016; B01J 20/28083; B01J 20/28085; B01D 15/18; B01D 15/206; G01N 30/38; G01N 30/52; G01N 2030/386; G01N 2030/525
See application file for complete search history.

(56) References Cited

U.S. PATENT DOCUMENTS

| | | |
|---|---|---|
| 3,782,075 A | 1/1974 | Kirkland |
| 4,442,045 A | 4/1984 | Sciolla |
| 4,627,918 A | 12/1986 | Saxena |
| 4,676,898 A | 6/1987 | Saxena |
| 4,751,004 A | 6/1988 | Stevens et al. |
| 4,815,925 A | 3/1989 | Buddenberg |
| 5,466,377 A | 11/1995 | Grandics et al. |
| 5,589,062 A | 12/1996 | Rice |
| 5,817,354 A | 10/1998 | Mozaffar et al. |
| 6,022,477 A | 2/2000 | Luo et al. |
| 6,171,486 B1 | 1/2001 | Green et al. |
| 8,188,180 B2 | 5/2012 | Jonschker et al. |
| 8,277,651 B2 | 10/2012 | Kerr et al. |
| 9,375,657 B2 | 6/2016 | Oroskar et al. |
| 9,504,936 B2 | 11/2016 | Wirth et al. |
| 9,536,892 B2 | 1/2017 | Masuoka et al. |
| 9,589,973 B2 | 3/2017 | Masuoka et al. |
| 2004/0069710 A1 | 4/2004 | Sirkar et al. |
| 2005/0211616 A1 | 9/2005 | DiLeo et al. |
| 2007/0138076 A1 | 6/2007 | Daridon et al. |
| 2010/0029794 A1 | 2/2010 | Yilmaz et al. |
| 2011/0097464 A1 | 4/2011 | Holm et al. |
| 2011/0233153 A1 | 9/2011 | Arifin et al. |
| 2012/0312010 A1 | 12/2012 | Yasoshima |
| 2013/0270167 A1 | 10/2013 | Raedts |
| 2014/0069870 A1 | 3/2014 | Pohl |
| 2014/0367338 A1 | 12/2014 | Gu et al. |
| 2015/0060342 A1 | 3/2015 | DiLeo et al. |
| 2015/0258540 A1 | 9/2015 | Yavorsky et al. |
| 2015/0314218 A1 | 11/2015 | Vroon et al. |
| 2016/0184736 A1* | 6/2016 | Wyndham .......... B01J 20/28004 210/656 |
| 2016/0223441 A1* | 8/2016 | Gjerde ................. G01N 33/574 |

FOREIGN PATENT DOCUMENTS

| | | |
|---|---|---|
| CN | 1087641 C | 7/2002 |
| CN | 102989263 A | 3/2013 |
| GB | 1430951 A | 4/1976 |
| JP | 2012-185067 A | 9/2012 |
| WO | 91/16116 A1 | 10/1991 |
| WO | 97/43024 A1 | 11/1997 |
| WO | 2007/067140 A1 | 6/2007 |

(Continued)

OTHER PUBLICATIONS

Berthod, A., et al., "Facile monitoring and evaluation of bacteria in a fermentation process using perfusion chromatography and polarimetry detection", J. Sep. Sci., 26, pp. 20-28. (Year: 2003).*
Sterogene Bioseparations, Inc., "Q Cellthru BigBead Plus". Internet Archive. (May 9, 2006).*
Besselink et al., "Are axial and radial flow chromatography different?", Journal of Chromatography A, 2013, vol. 1271, pp. 105-114.
Jinno et al., "Analytical Conditions and Separation Performance of Capillary Chromatography Based on the Tube Radial Distribution of Aqueous-Organic Mixture Carrier Solvents under Laminar-Flow Conditions", Analytical Sciences, 2010, vol. 26, pp. 737-742.

(Continued)

*Primary Examiner* — Benjamin L Lebron
(74) *Attorney, Agent, or Firm* — Hoffmann & Baron, LLP

(57) ABSTRACT

A system and method of applied radial technology chromatography using a plurality of beads is disclosed, with each bead comprising one or more pores therein having a diameter of about 250 Å to about 5000 Å, and each bead having an average radius between about 100 μm to about 250 μm. Also disclosed are processes for selecting beads for use in a radial flow chromatography column, and for purifying an unclarified feed stream using a radial flow chromatography column.

23 Claims, No Drawings

(56) References Cited

FOREIGN PATENT DOCUMENTS

| WO | 2008/101581 A1 | 8/2008 |
|---|---|---|
| WO | 2010/105185 A1 | 9/2010 |
| WO | 2011/035282 A1 | 3/2011 |
| WO | 2014/058570 A1 | 4/2014 |
| WO | 2014/142940 A1 | 9/2014 |
| WO | 2015/159414 A1 | 10/2015 |
| WO | 2015/189916 A1 | 12/2015 |

OTHER PUBLICATIONS

Kinna, A.W., "Improved production and purification of recombinant proteins from mammalian expression systems", Ph.D. Thesis, Department of Biochemical Engineering, University College London; Department of Oncology, UCL Cancer Institute, University College London, 2017, pp. 154-179 (downloaded from http://discovery.ucl.ac.uk/1536381/1/Thesis%20post%20viva%20corrections%20Final%20Copy.pdf).

Kinna et al., "IMAC Capture of Recombinant Protein From Unclarified Mammalian Cell Feed Streams", Biotechnology and Bioengineering, 2016, 113(1), pp. 130-140.

Lay et al., "Continuous Radial Flow Chromatography of Proteins", Trans IChemE, Part C, Food and Bioproducts Processing, 2006, 84(C1), pp. 78-83.

Tanigawa et al., "Influences of Analyte Injection Volumes and Concentrations on Capillary Chromatography Based on Tube Radial Distribution of Carrier Solvents under Laminar Flow Conditions", Chromatography, 2011, 32(3), pp. 135-140.

Yamada et al., "Capillary Chromatography Based on Tube Radial Distribution of Aqueous-Organic Mixture Carrier Solvents: Introduction of Double Tubes Having Different Inner Diameters to the System", Analytical Sciences, 2010, 26, pp. 507-510.

Yuhai et al., "Application of Adsorption Chromatography in the Papain Processing", GSTF International Journal of Chemical Sciences, (JChem), 2014, 1(2), pp. 9-15.

Abia et al., "Radial heterogeneity of some analytical columns used in high-performance liquid chromatography", Journal of Chromatography A, 2009, 1216(15), pp. 3185-3191.

Allinquant et al., "Reversed-phase high-performance liquid chromatography of nucleotides and oligonucleotides", Journal of Chromatography, 1985, 326, pp. 281-291.

Fujinaga et al., "Specific microfluidic behavior of ternary mixed carrier solvents of water-acetonitrile-ethyl acetate in open-tubular capillary chromatography and the chromatograms", Analytical Methods, 2012, 4(11), pp. 3884-3890.

Gritti et al., "Consequences of the radial heterogeneity of the column temperature at high mobile phase velocity", Journal of Chromatography A, 2007, 1166(1-2), pp. 47-60.

Gustavsson and Larsson, "Continuous superporous agarose beds in radial flow columns", Journal of Chromatography A, 2001, 925(1), pp. 69-78.

Jinno et al., "Tube radial distribution phenomenon observed in an aqueous micellar solution of non-ionic surfactant fed into a microspace and an attempt of capillary chromatographic application", Journal of Analytical Chemistry, 2013, 38(12), pp. 1070-1075.

Jinno et al., "Capillary chromatography based on tube radial distribution of aqueous-organic mixture carrier solvents: elution behavior of carboxylated polymer particles in the system", Journal of Chemical Engineering of Japan, 2009, 42 (10), pp. 767-770.

Kaczmarski et al., "Pressure, temperature and density drops along supercritical fluid chromatography columns. II. Theoretical simulation for neat carbon dioxide and cols. packed with 3-.mu.m particles", Journal of Chromatography A, 2012, 1250, pp. 115-123.

Kobayashi et al., "Open-Tubular Capillary Chromatoraphy Based on Tube Radial Distribution of the Water-Acetonitrile Containing Sodium Chloride Mixture Carrier Solvents", Journal of Liquid Chromatography & Related Technologies, 2015, 38(1), pp. 44-53.

Kopaciewicz, et al., "Influence of pore and particle size on the frontal uptake of proteins. Implications for preparative anion-exchange chromatography", Journal of Chromatography, 1987, 409, pp. 111-124.

Kudo et al., "Separation of dansyl-DL-amino acids by open tubular capillary chromatography based on tube radial distribution phenomenon of the ternary mixed carrier solvents", Analytical Methods, 2012, 4(4), pp. 906-912.

Kudo et al., "Effects of Tube Materials on Capillary Chromatography Based on Tube Radial Distribution of Ternary Mixture Carrier Solvents under Laminar Flow Conditions", Chromatographia, 2012, 75(7-8), pp. 417-421.

Park et al., "Axial development and radial non-uniformity of flow in packed columns", Journal of Chromatography A, 2002, 945(1-2), pp. 65-81.

Pauw et al., "Temperature effects in supercritical fluid chromatography: A trade-off between viscous heating and decompression cooling", Journal of Chromatography A, 2014, 1365, pp. 212-218.

Seubert et al., High-performance liquid chromatographic analysis of porphyrins and their isomers with radial compression columns, Analytical Biochemistry, 1982, 124(2), pp. 303-307.

Singh et al., "High throughput purification of recombinant human growth hormone using radial flow chromatography", Protein Expression and Purification, 2009, 68(1), pp. 54-59.

Tallarek et al., "Dynamic NMR microscopy of chromatographic columns", American Institute of Chemical Engineers, 1998, 44(9), pp. 1962-1975.

Tsukagoshi et al., "Influences of analyte injection volumes and concentrations on capillary chromatography based on tube radial distribution of carrier solvents under laminar flow conditions", Chromatography, 2011, 32(3), pp. 135-140.

Unesaki et al., "Influence of adding surfactants to an analyte solution on separation performance in open-tubular capillary chromatography based on the tube-radial distribution of ternary mixed carrier solvents", Chemistry Letters, 2012, 41(9), pp. 855-856.

Wallworth, D.M., "Practical aspects and applications of radial flow chromatography", Downstream Processing of Proteins: Methods and Protocols, 2000, pp. 173-184.

Wu et al., "Comparison of perfusion media and monoliths for protein and virus-like particle chromatography", Journal of Chromatography A, 2016, 1447, pp. 72-81.

Ekman et al., "Gel Chromatography on Sephadex Gels with Narrow Particle Size Distribution Obtained by Dry Elutriation," Analytical Biochemistry, 1976, 70(2), pp. 628-631.

Lee et al., "Radial-Flow Affinity Chromatography for Trypsin Purification: From Molecular Mechanisms to Large-Scale Processes," American Chemical Society, 1990, 427, pp. 104-117.

Unger et al., "Particle packed columns and monolithic columns in high-performance liquid chromatography-comparison and critical appraisal," Journal of Chromatography, 2007, 1184(1-2), pp. 393-415.

International Search Report and Written Opinion issued in International Application No. PCT/IB2018/001561, dated May 22, 2019 (11 pages).

* cited by examiner

SYSTEM AND METHOD OF APPLIED RADIAL TECHNOLOGY CHROMATOGRAPHY

CROSS-REFERENCE TO RELATED APPLICATION

This application claims priority to U.S. Provisional Application No. 62/595,826, filed on Dec. 7, 2017, the entire contents of which are incorporated by reference herein in entirety.

FIELD OF THE INVENTION

This disclosure relates to radial flow column chromatography, and more particularly to a radial flow column comprising beads of specific size and parameters to enhance filtration of unclarified feed streams, and methods of selecting the beads.

BACKGROUND OF THE INVENTION

Chromatography, as it is generally used, is a technique for the separation of various components of a sample mixture. In a liquid chromatography system, a sample followed by an elution fluid is injected into a chromatographic separation column. The separation column contains a packing or matrix medium or material which interacts with the various components of the sample to be separated. The composition of the separating medium depends on the fluid being directed therethrough to effect the desired separation. As the sample and elution fluids pass through the separating medium, the various components of the sample travel at different rates through the separating medium as a result of differential interactions. These components emerge separated in the outlet or effluent from the separation medium.

Various types of the vertical and horizontal flow separation columns are known in the art. With the need for high performance chromatography, horizontal flow type chromatographic columns were developed. Such horizontal or radial flow columns are described in, e.g., U.S. Pat. Nos. 4,627,918 and 4,676,898. In the horizontal or radial flow type columns, the sample and elution fluids are introduced via a distributor to the outer periphery or circumferential wall or surface of the separating medium or matrix, and the fluids pass horizontally or radially inwardly through the separation medium to a central or collection port and then elute from the column at different times and at different rates.

Later, chromatographic columns and methods were developed for direct processing of crude feeds for isolation of biologically active materials, including cell/fermentation harvest, tissue extracts, algae, plant derived cells and materials, and plasma/blood. The large bead chromatography media are packed into a standard, low pressure chromatography column in which end-plate screens are replaced with large pore screens (60-180 µm pores). The large pores prevent column blockage. Because particle sizes are large, the cellular material flows between the beads in the interparticle lumen, while the soluble product is captured by functional groups on the beads.

Traditionally, downstream processing of biologics from cell culture/fermentation harvests has required two major operations: i) feed stream preparation and ii) recovery and purification. The sample must be properly prepared before application to a column. This is both time consuming and can be quite costly. If preparation of the sample is needed, the feed stream is generally diluted to reduce cell density, viscosity, and salt concentration, all of which is beneficial for improved recovery and purification. Recovery involves the removal of cellular and other particulate materials by centrifugation and/or microfiltration, as well as an initial volume reduction step, typically ultrafiltration. Since conventional chromatography media are rapidly fouled by cell debris, particle-free feed must be prepared for the purification operation.

Centrifugation and filtration are not only lengthy and costly operations, they compromise quality. Proteases released from broken cells can degrade the target protein, further complicating the task of purification method development and increasing purification costs. The longer the contact time with the concentrated cellular debris, the more product may be lost.

Capture of the protein product directly from the unclarified feed would minimize product degradation and improve product quality, yield and process economy. Also, the capital-intensive recovery operation would be greatly simplified if the product capture and cell removal steps were combined into a single operation.

There are two approaches to directly capture product from unclarified feed, such as cell culture/fermentation harvest or other biological sample (e.g., blood plasma). One approach proposes fluidization of the capture resin particles. Via fluidization, the individual particles are separated so that the debris can exit the column bed unobstructed.

This approach suffers from several problems. The fluidized bed system operates at a predetermined high flow rate, and there is no flexibility in the operation or means for changing the size of the column. The buffer consumption of the system is higher than on packed bed systems, which is a significant cost factor for high value pharmaceutical products, many of which require specialized buffers for their purification. The ratio of column volume to solid phase particle volume is very high. This will negatively affect residence time and the binding capacity within the column, as there is not sufficient time for complete diffusion of target molecule into the solid phase. Furthermore, particles will collide within the column bed and solid phase fragments will generate so-called "fines", and reduce both the performance and reuse of the column. Fluidized bed operation also requires specialized, costly hardware and chromatography media.

The other approach is the use of packed bed columns for particulate removal. This avenue has remained largely unexplored for the following reason. To clear cellular debris on a packed bed column requires using large, preferably spherical particles. These particles require sufficient space in the interparticle lumen to let cells or other particulates of comparable size exit the column.

The downside of using large particles (beads) is that the protein binding capacity is a function of the available surface per unit volume of gel bed. Therefore with increased particle diameters a loss of binding capacity is observed. When the particle diameter is increased from 0.1 mm to 1 mm, such as is required to handle dense cell suspensions, approximately 90% of the protein binding capacity is lost. This made packed bed columns impractical for processing crude process feed streams.

Packed bed column operation, however, offers simplicity, efficiency and economy. It is flexible and relatively easy to scale. There is no need for specialized particles, equipment or training of the operators. The production floor-space is relatively small for standard chromatography, and there is no need for the modification of the height of the production facility to accommodate the fluidized bed equipment.

Product application rate is another important issue in terms of throughput of the operation. This is predetermined for fluidized bed systems, but for packed column systems just the reaction binding kinetics is the rate limiting factor. This allows higher throughput, up to 3-10 times higher than for fluidized bed systems.

After product capture, residual cellular material is removed by brief high-speed wash pulses. The product is then eluted by typical elution methods. Thus, the known large-bead chromatography resins allow direct processing of cell culture or fermentation broth as well as other unclarified feeds in a packed bed column by combining cell removal with simultaneous product capture.

U.S. Pat. No. 5,466,377 proposed a method and large bead chromatography particles for the direct capture of a desired product from unclarified process liquor on standard, low pressure, packed bed chromatography columns.

There remains a need for improved chromatographic materials and methods to achieve direct processing of crude feeds, such as cell culture/fermentation harvests tissue extracts, cell fragments, viruses, blood plasma, waste feed streams derived from vegetable or fruit extracts or waste feed streams derived from milk processing or other natural material sources, on packed bed columns.

SUMMARY OF THE INVENTION

A radial flow chromatography column is disclosed including: a plurality of beads, with each bead comprising one or more pores therein, and interstitial channels formed between the beads. Each pore has a diameter of about 250 Å to about 5000 Å, at least about 80% of the plurality of beads have a diameter of about 200 μm to about 500 μm and the beads have an average radius R of between about 100 μm to about 250 μm. The beads may be monodisperse (i.e., all beads having a radius of ± about 10% of a targeted or labeled radius) or may have r<0.414 R or r<0.225 R removed.

A process for selecting beads for use in a radial flow chromatography column is also disclosed. That process comprises: a) identifying a narrow desirable bead radius R range based on the components (or particles of interest) present in the feed stream; b) removing beads of a defined radius r, which are outside of the desirable bead range; and c) defining the percentage of bead radius R within the desirable bead range. The beads of radius r may be removed by wet or dry sieving and/or elutriation. The beads being removed may be those having a radius r<0.414 R or r<0.225 R.

Also, disclosed herein is a process for purifying an unclarified feed stream using a radial flow chromatography column including: a plurality of beads, with each bead comprising one or more pores therein, and interstitial channels formed between the beads, wherein each pore has a diameter of about 250 Å to about 5000 Å, at least about 80% of the plurality of beads have a diameter of about 200 μm to about 500 μm and the beads have an average radius R of between about 100 μm to about 250 μm. That process comprises the steps of: a) packing the radial flow column with beads; b) processing a clarified feed stream containing a particle of interest to calibrate purification conditions; c) determining the binding of the particle of interest from the results of step b; and d) processing an unclarified feed stream comprising the particle of interest.

DETAILED DESCRIPTION

Radial flow columns and methods of making and using the same are provided for direct filtration, i.e., processing, of crude biological feed streams, e.g., unclarified (i.e., unfiltered) cell cultures. The subject disclosure achieves purification at a substantially lower cost and with faster processing, especially compared to methods such as packed bed chromatography and expanded bed chromatography. Exemplary applications include fractionation of blood plasma; bioprocessing of cell cultures to isolate and purify proteins (specifically pharmaceuticals such as herceptin, insulin, avastin, etc.); virus and virus-like particle capture and purification; purification of waste feed streams derived from vegetable or fruit extracts, and waste feed streams derived from milk processing or other natural material sources.

The chromatography disclosed herein surprisingly and beneficially allows whole cells and other particles to pass undamaged around and between the disclosed beads without clogging the gel bed, and allows direct passage of unclarified (non-filtered) feed streams of cell cultures, which contain whole cells, cell fragments, homogenates of native or recombinant plant materials, nano-particle solutions, and/or other particles (which normally clog columns having small beads). It is also able to selectively bind molecular targets of interest in the feed stream, which subsequently may be recovered. For example, for IgG purification, the beads may be functionized by covalently binding Protein A or Protein G to the surface of the bead to allow reversible IgG binding followed by washing and subsequent elution. For virus and VLP capture, the beads may be modified to have a high outer surface area and high (positive) charge density.

Disclosed herein is a radial flow chromatography column comprising a plurality of beads, with each bead comprising one or more pores therein, and interstitial channels formed between the beads.

The radial flow column may be made in accordance with any known radial flow column, except for the differences discussed herein specifically with respect to the beads, gel beds, pores and channels. The radial flow column may have a bed length of about 3 cm to about 50 cm and the bed volume (V) may range from about 5 ml to about 1000 liter. The radial flow column may be shaped as a "donut" (full size radial flow column, having the form of a right circular hollow cylinder), a "cake" slice (having the form of a trapezoidal prism, i.e., small section of donut, having same bed length/radius and curvature but smaller volume), or a truncated "cone" (having the form of a frustum or truncated cone, arising from a small cylindrical core section taken out of cake or donut, having same bed length/radius and curvature, but even smaller volume than "cake").

The column may include one or more porous filter frits. Often there is an outer frit and an inner frit. Each frit may be designed to have a pore size between about 40 μm to about 300 μm, about 80 μm to about 250 μm, or about 100 μm to about 200 μm. The frit may be made of any conventionally known material. Optionally, it may be made from stainless steel, or stainless steel and one or more polymer, such as, but not limited to polyethylene (PE) or polypropylene (PP).

The radial flow column of the "donut", "cake" or "cone" shape all have constant ratios of the area of the outer frit to the area of the inner frit. This ratio can be in the range of 1.5:1 to 10:1. The preferable range is 2:1 to 4:1. The flow dynamics of the three different shapes having identical bed lengths and an outer to inner frit area ratio are virtually identical.

The beads may be spherical or near spherical. The beads may be made of a polymer, glass, alumina, metal or other crystalline, semi-crystalline or amorphous material, silica, controlled pore glass (CPG), cellulose, encapsulated iron particles, encapsulated CPG, encapsulated silica, or any combination thereof. The polymer beads may be made of any polymer known for use in the art, for example, a polyacrylate, e.g., methacrylate, a polystyrene, or a polysaccharide, such as dextran, pullulan, agarose, or native or bonded polysilicates. The beads may consist of two or more homogeneously or heterogeneously blended polymers. The polymer beads may be spherical (or nearly spherical) polysaccharide beads.

The beads may have average diameters of between about 200 µm to about 1000 µm, or about 200 µm to about 500 µm. In an embodiment, at least about 80% of the polymer beads have a diameter of about 200 µm to about 500 µm, or at least about 85%, or at least about 90% of the polymer beads have a diameter of about 200 µm to about 500 µm.

The beads may have an average radius (R) of between about 100 µm to about 500 µm, or about 100 µm to about 250 µm.

Most beads are not generally monodisperse (all the same size with the same diameter) but have a range of diameters which extend out beyond the given range. Therefore, for example this measurement means that 80% of the total mass (or volume) of the beads falls within 200-500 µm. The other 20% (independently of how the percentage is defined) is outside the range, either smaller or larger. In order for the interstitial channels to not clog, it is important that the smaller beads in the 20% outside the given range are removed or at least depleted at some time prior to packing the column. If the smaller beads that are nearly the same size as the diameter of the channel are not depleted or removed, a gel bed of beads between 200-500 µm may contain enough small beads to partially or completely block the channels.

Some chromatography beads are commercially available and often are sold by bead diameter. However, the given diameter is an average of bead diameters; it does not mean that all of the beads have that given diameter. Other companies may sell beads by listing a range of bead diameters. However, this is the range in which a certain, sometimes undefined, percentage of beads falls within. The total percentage of beads having a diameter which falls outside the given range is then unknown; there is rarely a given percentage of beads which fall above or below the range.

The beads may have functionalized groups (e.g., ionic exchange groups, hydrophobic interaction groups, etc.), allowing them to selectively bind molecular targets of interest (for potential later recovery). Potential targets include viruses, virus-like particles, proteins (specifically, but not limited to, IgG, IgM, IgY, and blood proteins), DNA, RNA, oligonucleotides, polypeptides and cells.

The beads have one or more pores therein. Each pore has a diameter of about 250 Å to about 5000 Å. Each pore may extend partially through the bead resulting in a dead-end, or may go all the way through the bead to another exit point.

Interstitial channels are formed between packed beads and partially comprising the void volume. When these channels are wide enough to allow the cells and cell fragments to pass through the gel bed without clogging and when the channels are free of smaller beads which, due to their size, could restrict or block the passage of cells and cell fragment, the user can utilize the packed beads to avoid deleterious filtration or centrifugation, precipitation or other costly, time-consuming and potentially product-losing steps prior to the chromatography purification step.

Monodisperse spherical beads will ideally pack in either hexagonal close packing (HCP) or cubic close packing (CCP) arrangements. Both packing arrangements have the same maximum bead (sphere) density and both have similar packing energies, so neither is clearly energetically favored over the other. Although the preferred packing arrangement of polymer, e.g., polysaccharide, beads is not predictable, both packing arrangements form channels (interstitial space or channels) between the beads, the smallest size of which is important to the success or failure of the device and system disclosed herein.

The interstitial channels should be: 1) large enough to allow cells, cell fragments and other interfering particles to pass through without clogging the gel bed; 2) free of smaller beads which are of similar size to the interstitial channel itself and could therefore clog the channels; and 3) formed from a population of beads having as narrow a range of bead diameters as possible, with monodisperse beads being as close to ideal size as possible.

In addition, the interstitial channels should not be compressed too narrowly, which could clog the interstitial channels, by creating: i) too high a flow rate, ii) too high pressure, or iii) too high densely packing of the beads. The interstitial channels should be open (i.e., free from clogs) to provide a continuous path for processing the feed stream. Also, too high of a flow rate will narrow the interstitial channels of a non-rigid gel bed. Therefore, the gel bed must have enough rigidity to allow flow rates of 0.1 column volumes to 10 column volumes per minute without narrowing the interstitial channels (through bead compression) to allow cells and cell fragments to pass through the gel bed.

Rigidity of the gel bed also depends on the rigidity of the beads themselves. To minimize changes in the diameter/size of the interstitial channels between beads (assuming all beads are spherical or near-spherical and with a given size distribution), it is important that the morphology of the beads does not change under flow conditions.

One option is to use very rigid beads that are inert to the buffers used in chromatographic separations and thus will exhibit no change in their size or shape; however, beads made from silica or CPG (Controlled Pore Glass), for example, which have excellent mechanical rigidity and stability, have little or no tolerance towards NaOH.

Polymer beads, such as, but not limited to methacrylate or polystyrene beads, can be made more reagent stable and retain rigidity. Polysaccharide beads, such as, but not limited to dextran or agarose beads, are less rigid but are more stable to reagents such as NaOH. However, polysaccharide beads are often "softer" than other polymer beads and thus more prone to becoming compressed. The degree to which compression occurs will depend on the applied pressure from liquid flowing through the packed gel bed. Too much compression will result in a non-porous bed through which no flow is possible (closure of both internal pore network and interstitial spaces). The key factors which usually lead to this increase in pressure and compression are the flow rate of the applied liquid (normally expressed as mL/min, CV/min or cm/hr) and the viscosity of the liquid.

The mechanical stability and rigidity of softer polysaccharide beads may be enhanced by applying certain procedures. For example, the following approaches will improve mechanical stability and rigidity of the beads:

1. Crosslinking within the polysaccharide structure. This will make the beads more resistant to pressure and thus preserve the bead morphology. However, depending on the crosslinking chemistry applied, the size of the internal pores within the bead structure may be affected.
2. Increasing the density of the amount of polysaccharide used in the formulation of the beads. This is often done with agarose-based particles. Standard commercially available agarose beads have agarose percentages between about 2 and 10% (20 to 100 grams of agarose per litre of formulated beads). A bead having increased density may have ≥ about 6% agarose. However, this increase in density may reduce the internal pore sizes of the beads:
4% beads have an average molecular weight cut-off of around 20 million Dalton
6% beads have an average molecular weight cut-off of around 4 million Dalton The optimal interstitial channel size, which is dependent on the bead size, ultimately depends upon the components present in the feed stream. Specifically, the optimal size of the interstitial channels depends on the particles that are to desirably pass through the gel bed. The process of determining the best size for the interstitial channels may be as follows:

1. Determination of Bead Size: From the radius of the cells or fragments that are to pass through the gel bed, estimate the required radius of the channel formed by three beads (the "Narrowest Channel Radius") and calculate the minimum bead size necessary.
2. Determination of Size Fraction to be Removed from Gel: From the radius of the beads (monodisperse bead radius or average of bead radii for polydisperse beads), calculate the length of the radii of the tetrahedral and octahedral sites. The radii of these sites are those of the largest beads which must be removed from the gel.

Then the theoretically largest diameter of a small sphere which can fit through the smallest channel formed between three perfect identical spheres has been calculated. The diameter of the channel may be about 3 to about 10-fold larger, or about 4 to about 6-fold larger than the largest particle (i.e., cell, cell fragment, or other particle) that is present in the unclarified feed stream.

For Cubic Close, Hexagonal Close, or Barlow Packing of monodisperse beads, fully settled, vibrated to no measurable change in the packing density (Kepler Conjecture), the following holds true:

Tetrahedron site radius $r_{tet}=0.225$ R (R is the Radius of the bead, $r_{tet}$ is the radius of the Tet-site)

Octahedron site radius $r_{oct}=0.414$ R (R is the Radius of the bead, $r_{oct}$ is the radius of the Oct-site)

Narrowest Channel radius $r_{cha}=0.155$ R (R is the Radius of the bead, $r_{cha}$ is the radius of the channel)

Beads having a radius of x, where $0.155$ R$<$x$<0.414$ R have a size which can fit into and permanently occupy an Octahedron site.

Beads having a radius of x, where $0.155$ R$<$x$<0.225$ R have a size which can fit into and permanently occupy a Tetrahedron site.

Both tetrahedron and octahedron "holes" are always present in a bed of packed beads. The holes are named tetrahedron or octahedron based on the number of beads that surround and form the hole.

For Random Close Packing of polydisperse beads, the above values are a minimum and actual values may be larger. Channels of radius $r_{cha}=0.155$ R should be a minimum of 1.1-fold (preferably about 2 to about 4-fold) the radius of the cell, fragment or particulate to pass easily through the gel bed.

The monodisperse beads may be prepared by:
a. manufacturing monodisperse beads with an optimal radius and complete absence of smaller beads;
b. manufacturing a narrow range of polydisperse beads by carefully controlling the conditions during an emulsion process. These conditions include: addition of an optimal type and amount of emulsifier, maintaining an optimal stirring speed, maintaining an optimal temperature, all which contribute to a narrowing of the size distribution of beads formed;
c. wet or dry sieving to remove the fraction of particles smaller (or larger) than a selected size; and/or
d. elutriation to remove the fraction of particles smaller than a determined size.

To improve filtration, smaller beads that could clog the interstitial channels may be removed prior to packing of the gel bed.

The interstitial channels may be improved in form and function by taking some or all of the following steps:
a. Calculate/determine the desirable average bead radius R to allow cells, fragments of cells, or other particulates to pass through, for example, using the information shown in Tables 1-3 below.
b. Form a gel bed where beads having radius r<0.414 R have been removed.
    i. Removal of all beads having radius r<0.414 R will create a gel bed with maximum flow and porosity, and shorter path. A benefit thereof is faster purification processing.
c. Form a gel bed where beads having radius r<0.225 R have been removed.
    i. Removal of all beads having radius r<0.225 R will create a gel bed with somewhat decreased porosity, an increased path length, and increased residence time. A benefit thereof is more efficient purification.
d. Removal of the smaller beads having radius r<0.225 R or r<0.414 R will prevent blockage/clogging of interstitial channels in the gel bed. This will also reduce the amount of cleaning of gel bed required between purification cycles.
e. Increase the radius r of the beads to be removed by up to 25% (i.e., the beads being removed have a radius r that is 25% larger than otherwise indicated).
f. Narrow the bead size distribution as much as possible to achieve reduced Random Close Packing density and to approach Cubic Close/Hexagonal Close packing density.

TABLE 1

| Average Bead diameter (μm) | Interstitial Channel diameter (μm) | |
|---|---|---|
| 100 | 15.5 | |
| 150 | 23.2 | |
| 200 | 30.9 | Target |
| 250 | 38.7 | Channel |
| 300 | 46.4 | Sizes |
| 350 | 54.1 | |
| 400 | 61.9 | |
| 450 | 69.6 | |
| 500 | 77.4 | |
| 750 | 116 | |
| 1000 | 154.7 | |

TABLE 2

| Cell/ Particle of interest | Average Diameter (μm) | Will fit into Interstitial Channels of (μm, 3-fold max) |
|---|---|---|
| E. Coli Cell | 2 | 6 |
| HEK-293 Cell | 13 | 39 |
| CHO Cell | 15 | 45 |

TABLE 2-continued

| Cell/Particle of interest | Average Diameter (μm) | Will fit into Interstitial Channels of (μm, 3-fold max) |
|---|---|---|
| Yeast Cell | 5 | 15 |
| Tobacco BY-2 Cell | 35-100 | 105-300 |
| Vero Cell | 8 | 24 |
| Virus | 0.017-0.5 | 0.05-1.5 |
| Plasmid DNA | 0.001-0.003 | 0.003-0.010 |

TABLE 3

| Protein/Particle of interest | Average Diameter (Å) | Will fit into Bead Pores of (Å, 6-fold max) |
|---|---|---|
| IgG | 120 | 720 |
| IgM | 350-600 | 2100-3600 |
| Plasmid DNA | 12-30 | 72 |
| Virus | 170-2500 | 1020-15000 |

Another embodiment is a process for selecting beads for use in a radial chromatography gel bed which includes: a) identifying a narrow desirable bead diameter (or radii) range based on the components (or particles of interest) present in the feed stream; b) removing beads of a defined diameter (or radii) outside of the desirable bead diameter range; and c) defining the percentage of bead diameters (radii) within the desirable bead diameter range.

Yet another embodiment is a process for filtering an unclarified feed stream using a radial flow column disclosed above comprising the steps of:
  a. packing the radial flow column with beads;
  b. processing a clarified feed stream containing a particle of interest to calibrate purification conditions;
  c. determining the binding of the particle of interest from the results of step b; and
  d. processing an unclarified feed stream comprising the select protein.

The particle of interest may be a whole cell, cell fragment, virus, or protein. It may be a VLP, DNA, RNA, antigen, liposome, oligo- or polysaccharide.

After packing the radial flow column with the beads, a clarified feed stream is used for calibrating optimal purification conditions prior to actual routine purification of unclarified feed streams. This provides an understanding of how the particle of interest, such as protein, binds on the column (RFC, Zetacell™). For purification of unclarified streams, both forward and backward washing may be used to remove cell/cell fragment traces. Cake or cone shapes may be used for small scale optimization before scaling up/using donut shape. The process may be used in conjunction with "simulated moving bed" ("SMB")/continuous processes.

Depending on the reagent systems used during chromatography, the polymer beads will shrink and swell, thereby increasing and decreasing both internal pore diameters as well as the interstitial spaces between the (spherical) beads. This does not occur with silica and CPG particles, but occurs for all polymer and polysaccharide particle-based gel beds. The effects of the swelling and shrinking may be controlled, in entirety, in near entirety, or at least in part, by the ordinarily skilled artisan's careful selection of the buffer system used to pack the column and used during routine operation.

After optimizing the process with clarified feed streams directly on a small radial flow chromatography column containing polymer beads as a gel bed, linear scale up to a larger process scale may be achieved by maintaining the bed length, maintaining the ratio of outer to inner frit areas and maintaining all operational parameters (flow rate, number of column volumes per unit time, buffer composition, residence time, solid phase, pressure, and temperature) for each step of the process (loading of clarified or unclarified feed stream, washing in forward and reverse directions to remove cells, cell debris and non-bound materials, elution to release directly captured target from the solid phase, regeneration to clean and prepare the column and solid phase for subsequent reuse). If at any time there is a need to re-calibrate, re-optimize or otherwise change the large scale purification system, linear scale down to a manageable and small RFC column is also achieved by maintaining the bed length, maintaining the ratio of outer to inner frit areas and maintaining all operational parameters (flow rate, number of column volumes per unit time, buffer composition, residence time, solid phase, pressure, and temperature) for each step of the process (loading of clarified or unclarified feed stream, washing in forward and reverse directions to remove cells, cell debris and non-bound materials, elution to release directly captured target from the solid phase, regeneration to clean and prepare the column and solid phase for subsequent reuse).

The foregoing illustrates some of the possibilities for practicing the invention. Therefore, although specific example embodiments have been described, it will be evident that various modifications and changes may be made to these embodiments without departing from the broader scope of the invention; many other embodiments are possible within the scope and spirit of the invention. Various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the above Description of the invention, with each claim standing on its own as a separate example embodiment.

It should be noted that it is envisioned that any feature or element that is positively identified in this document may also be specifically excluded as a feature or element of an embodiment of the present invention as defined in the claims. It should also be noted that it is envisioned that any feature or element that is positively identified (or that is excluded, either specifically or by implication) may be used in combination with any other feature or element that is positively identified (or that is excluded, either specifically or by implication).

What is claimed:

1. A radial flow chromatography column system comprising:
  a radial flow chromatography column having a bed length of about 3 cm to about 50 cm,
  a plurality of beads packed in the radial flow chromatography column, and
  unclogged interstitial channels formed between the beads, wherein each bead comprises one or more pores, and each pore has a diameter of about 250 Å to about 5000 Å, wherein at least about 80% of the plurality of beads have a diameter of about 200 μm to about 500 μm, wherein the beads have an average radius R of about 100 µm to about 250 µm, and wherein the beads maintain their size and morphology under flow rates to 10 column volumes per minute, wherein the beads are monodisperse wherein all beads have a radius of ± about 10% of a targeted or labeled radius and smaller beads having a radius r<0.225 R have been removed prior to packing the column, and wherein the system provides for purifying a particle of interest by direct filtration from an unclarified feed stream or crude biological feed stream.

2. The radial flow chromatography column system of claim 1, wherein the bead is made of a polymer, glass, alumina, silica, controlled pore glass (CPG), cellulose, encapsulated iron particles, encapsulated CPG, or encapsulated silica.

3. The radial flow chromatography column system of claim 2, wherein the bead is a polymer bead.

4. The radial flow chromatography column system of claim 1, wherein any beads having r<0.414 R have been removed.

5. The radial flow chromatography column system of claim 1, wherein the interstitial channels have: a tetrahedron site radius $r_{tet}$=0.225 R, an octahedron site radius $r_{oct}$=0.414 R, or both.

6. The radial flow chromatography column system of claim 1, wherein the interstitial channels have a narrowest channel radius $r_{cha}$=0.155 R.

7. The radial flow chromatography column system of claim 1, wherein the particle of interest is a protein, virus, VLP, DNA, RNA, antigen, liposome, oligo- or polysaccharide, or any combination thereof.

8. A process for selecting beads for use in the radial flow chromatography column of claim 1 comprising: a) identifying a narrow desirable bead radius R range based on the components present in the feed stream; b) removing beads of a defined radius r, which are outside of the desirable bead range; and c) defining the percentage of bead radius R within the desirable bead range.

9. The process of claim 8, wherein the bead is made of a polymer, glass, alumina, metal or other crystalline, semi-crystalline or amorphous material, silica, controlled pore glass (CPG), cellulose, encapsulated iron particles, encapsulated CPG or encapsulated silica.

10. The process of claim 8, wherein the bead is a polymer bead.

11. The process of claim 8, wherein the beads of radius r are removed by wet or dry sieving, and/or elutriation.

12. The process of claim 8, wherein beads having radius r<0.414 R are removed.

13. A process for purifying an unclarified feed stream using the radial flow chromatography column of claim 1 comprising the steps of:
 a. packing the radial flow column with the beads;
 b. processing a clarified feed stream containing a particle of interest to calibrate purification conditions;
 c. determining the binding of the particle of interest from the results of step b;
 d. processing an unclarified feed stream comprising the particle of interest.

14. The process of claim 13, wherein the particle of interest is a protein, virus, VLP, DNA, RNA, antigen, liposome, oligo- or polysaccharide, or any combination thereof.

15. A radial flow chromatography filtration system for isolating one or more particle of interest comprising:
 a radial flow chromatography column having a bed length of about 3 cm to about 50 cm,
 a plurality of beads packed in the radial flow chromatography column,
 unclogged interstitial channels formed between the beads, and
 an unclarified feed stream comprising a plurality of particles;
 wherein each bead comprises one or more pores therein, and each pore has a diameter of about 250 Å to about 5000 Å,
 wherein at least about 80% of the plurality of beads have a diameter of about 200 µm to about 500 µm,
 wherein the beads have an average radius R of about 100 µm to about 250 µm,
 wherein the beads maintain their size and morphology under flow rates to 10 column volumes per minute,
 wherein the beads are monodisperse wherein all beads have a radius of ± about 10% of a targeted or labeled radius and smaller beads having a radius r<0.225 R have been removed prior to packing the column, and
 wherein the diameter of each of the interstitial channels is about 3 to about 10-fold larger than the largest particle in the unclarified feed stream.

16. The radial flow chromatography filtration system of claim 15, wherein the bead is made of a polymer, glass, alumina, silica, controlled pore glass (CPG), cellulose, encapsulated iron particles, encapsulated CPG, or encapsulated silica.

17. The radial flow chromatography filtration system of claim 16, wherein the bead is a polymer bead.

18. The radial flow chromatography filtration system of claim 15, wherein the particle of interest is a protein, virus, VLP, DNA, RNA, antigen, liposome, oligo- or polysaccharide, or any combination thereof.

19. A process for selecting beads for use in the radial flow chromatography column of claim 15 comprising: a) identifying a narrow desirable bead radius R range based on the components present in the feed stream; b) removing beads of a defined radius r, which are outside of the desirable bead range; and c) defining the percentage of bead radius R within the desirable bead range.

20. The process of claim 19, wherein the bead is made of a polymer, glass, alumina, metal or other crystalline, semi-crystalline or amorphous material, silica, controlled pore glass (CPG), cellulose, encapsulated iron particles, encapsulated CPG or encapsulated silica.

21. The process of claim 19, wherein the bead is a polymer bead.

22. The process of claim 19, wherein the beads of radius r are removed by wet or dry sieving, and/or elutriation.

23. The process of claim 19, wherein beads having radius r<0.414 R are removed.

* * * * *